(12) United States Patent
Arai et al.

(10) Patent No.: US 11,722,288 B2
(45) Date of Patent: Aug. 8, 2023

(54) TIME SYNCHRONIZATION PATH SELECTION DEVICE AND TIME SYNCHRONIZATION PATH SELECTION METHOD

(71) Applicant: Nippon Telegraph and Telephone Corporation, Tokyo (JP)

(72) Inventors: Kaoru Arai, Tokyo (JP); Hiroki Sakuma, Tokyo (JP); Masahiro Nakagawa, Tokyo (JP); Shunichi Tsuboi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 205 days.

(21) Appl. No.: 17/413,863

(22) PCT Filed: Dec. 6, 2019

(86) PCT No.: PCT/JP2019/047787
§ 371 (c)(1),
(2) Date: Jun. 14, 2021

(87) PCT Pub. No.: WO2020/129701
PCT Pub. Date: Jun. 25, 2020

(65) Prior Publication Data
US 2022/0060310 A1 Feb. 24, 2022

(30) Foreign Application Priority Data

Dec. 17, 2018 (JP) .................................. 2018-235731

(51) Int. Cl.
*H04L 7/00* (2006.01)
*H04J 3/06* (2006.01)
(Continued)

(52) U.S. Cl.
CPC .......... *H04L 7/0016* (2013.01); *H04J 3/0679* (2013.01); *H04W 40/02* (2013.01); *H04W 56/001* (2013.01)

(58) Field of Classification Search
CPC ...... H04J 3/0658; H04J 3/0661; H04J 3/0667; H04J 3/0679; H04L 7/0016; H04L 45/302;
(Continued)

(56) References Cited

U.S. PATENT DOCUMENTS

2016/0073365 A1   3/2016 Klockar
2016/0197719 A1*  7/2016 Wang .................... H04J 3/0641
                                            709/248
(Continued)

OTHER PUBLICATIONS

[No Author Listed], "Precision time protocol telecom profile for phase/time synchronization with full timing support from the network," Telecommunication Standardization Sector of ITU, ITU-T G.8275.1/Y.1369.1, Jun. 2016, 56 pages.
(Continued)

*Primary Examiner* — Pao Sinkantarakorn
*Assistant Examiner* — Pawaris Sinkantarakorn
(74) *Attorney, Agent, or Firm* — Fish & Richardson P.C.

(57) ABSTRACT

[Problem to be Solved] Optimizing a route of time synchronization in a network including apparatuses with different types of precision classes.
[Solution to the Problem] A time transmission system includes BC nodes 200 with different types of apparatus performances, and multiple routes of PTP packets from GM nodes 101 and 102 to a BC node 220 via the BC node 200 are present. Each BC node 200 located upstream on a route performs notification of performance information indicating its apparatus performance to the BC node 200 located downstream with respect thereto. The BC node 220 includes a determination index calculation unit 11 that calculates a determination index for each route by referencing the performance information notified from the BC nodes 200 located upstream on each route, and a route selection unit 12 that selects a route for transmitting and receiving PTP
(Continued)

packets from multiple routes of PTP packets to the BC node 220, based on the calculated determination index for each route.

7 Claims, 14 Drawing Sheets

(51) Int. Cl.
*H04W 40/02* (2009.01)
*H04W 56/00* (2009.01)

(58) Field of Classification Search
CPC ............... H04W 40/02; H04W 56/001; H04W 56/0015
See application file for complete search history.

(56) References Cited

U.S. PATENT DOCUMENTS

| 2017/0353292 | A1* | 12/2017 | Thubert | ................ | H04W 40/02 |
| 2018/0242267 | A1* | 8/2018 | Jiang | ................... | H04W 56/001 |
| 2019/0020463 | A1* | 1/2019 | Xu | ........................ | H04J 3/0679 |
| 2020/0413360 | A1* | 12/2020 | Ruffini | .............. | H04W 56/0015 |

OTHER PUBLICATIONS

Sugiyama et al., "Study on Time Route Optimization Based on MTIE in Time Synchronization Network," 2018 IEICE General Conference Correspondence Lecture Proceedings 2, Mar. 20, 2018, p. 149, 3 pages (with English Translation).

\* cited by examiner

Fig. 2

| ROUTE | CLASS | NUMBER PASSED [APPARATUSES] | MAXIMUM ABSOLUTE TIME ERROR [ns] | DETERMINATION INDEX |
|---|---|---|---|---|
| 1 | A | 0 | 100 | 140 |
| | B | 2 | 70 | |
| | C | 0 | 20 | |
| | D | 0 | 10 | |
| 2 | A | 0 | 100 | 60 |
| | B | 0 | 70 | |
| | C | 3 | 20 | |
| | D | 0 | 10 | |

Fig. 10

| ROUTE | ORDER OF PASSED APPARATUSES | TIME ERROR [ns] | DETERMINATION INDEX |
|---|---|---|---|
| 1 | 1 | 100 | 250 |
|   | 2 | 100 |   |
|   | 3 | 50  |   |
| 2 | 1 | 150 | 280 |
|   | 2 | 80  |   |
|   | 3 | 50  |   |

TIME SYNCHRONIZATION PATH SELECTION DEVICE AND TIME SYNCHRONIZATION PATH SELECTION METHOD

CROSS-REFERENCE TO RELATED APPLICATIONS

This application is a National Stage application under 35 U.S.C. § 371 of International Application No. PCT/JP2019/047787, having an International Filing Date of Dec. 6, 2019, which claims priority to Japanese Application Serial No. 2018-235731, filed on Dec. 17, 2018. The disclosure of the prior application is considered part of the disclosure of this application, and is incorporated in its entirety into this application.

TECHNICAL FIELD

The present invention relates to a time synchronization route selection apparatus and a time synchronization route selection method.

BACKGROUND ART

A time synchronization technique will be required in next-generation mobile communication 5G (Generation) and the like in intra-base station linking on mobile. For example, a time synchronization system is realized using a configuration in which GMs (Grand Masters) are arranged at points in a dispersed manner.

The GMs at the points function as GNSS (Global Navigation Satellite System) receivers that directly receive signals from GNSS satellites, and distribute the received signals directly to end applications.

However, if the number of high-performance GNSS receivers is increased, the cost also increases accordingly. Also, the time synchronization precision deteriorates in a time span during which signals from the satellites cannot be received due to bad weather.

In view of this, for example, PTP (Precision Time Protocol), in which time synchronization is performed using time stamps of packets, is used as a mode for distributing information from a GM using a packet network (i.e., indirectly receiving GNSS signals). In PTP, time synchronization is performed via a highly-reliable network of a telecommunications carrier.

This makes it possible to aggregate the reception points and installation count of GNSS antennas serving as time references, and to improve the reliability of GNSS reception by equipping the aggregated GNSS receivers (GMs) with a monitoring function. The reliability can also be improved through route duplication of the packet network. Furthermore, the GMs can transmit time information economically and with increased time synchronization precision by superimposing PTP packets on main signals.

FIG. 12 is a configuration diagram of a time transmission system to which a time synchronization technique has been applied.

The time transmission system is constituted by a GM node 82, which is a PTP node corresponding to PTP, BC (Boundary Clock) nodes 83 and 84, and an OC (Ordinary Clock) node 85 being connected to each other by a network. The BC nodes 83 and 64 are apparatuses that terminate and relay PTP packets.

Hereinafter, between PTP nodes that directly perform time synchronization, a PTP node that provides time information is referred to as a master node 91 (FIG. 13), and a synchronized apparatus that receives time information from the master node 91 is referred to as a slave node 92 (FIG. 13). Hereinafter, a sequence of transmission of the time information will be described using the thick-lined arrows in FIG. 12. The base side of a thick-lined arrow is the upstream side, and the tip side of a thick-lined arrow is the downstream side. That is, accurate time information is transmitted downstream in the following order: GM node 82→BC node 83→BC node 84→OC node 85.

The GM node 82 includes an antenna 82a that directly receives signals from the GPS satellite 81.

The BC node 83 is a slave node 92 that receives time information from the GM node 82, which is the master node 91, and thereafter functions as a master node 91 that provides time information to the BC node 84.

The BC node 84 is a slave node 92 that receives time information from the BC node 83, and thereafter functions as a master node 91 that provides time information to the OC node 85.

The OC node 85 is a slave node 92 that receives time information from the BC node 84, and thereafter provides time information to an end terminal 86.

Note that the difference in naming between the BC nodes 83 and 84 and the OC node 85 is due to the fact that the BC nodes 83 and 84 have multiple connection ports for connecting to other PTP nodes, and the OC node 85 only has one.

FIG. 13 is a sequence chart showing a mechanism of PTP.

PTP packets to which time information (time stamps) has been added are transmitted and received by the master node 91 and the slave node 92. As the PTP packets, a downstream Sync message (S11), a downstream Follow-up message (S12), an upstream Delay_Request message (S13), and a downstream Delay_Response message (S14) are transmitted and received in order.

A departure time t1 is a time at which a Sync message (S11) is transmitted from the master node 91. Note that since it is difficult to include the departure time t1 of the Sync message in the Sync message itself, the departure time t1 of the Sync message is notified to the slave node 92 in a subsequent Follow-up message.

An arrival time t2 is a time at which the Sync message arrives at the slave node 92.

A departure time t3 is a time at which a Delay_Request message is transmitted from the slave node 92.

An arrival time t4 is a time at which the Delay_Request message arrives at the master node 91. The arrival time t4 is notified to the slave node 92 by being included in a Delay_Response message transmitted in response to the Delay_Request message.

Accordingly, the slave node 92 can ascertain all four time stamps (departure time t1 to arrival time t4).

The following transmission delays occur in the transmission and reception of the PTP packet.

A downstream delay Dms is a transmission delay of a Sync message in the downstream direction, that is, master node 91→slave node 92. Letting deviation of a clock in the slave node 92 with respect to a clock in the master node 91 is set to be an offset value, the downstream delay Dms is obtained using the following formula: (arrival time t2−offset value)−arrival time t1.

An upstream delay Dsm is a transmission delay of a Delay_Request message in the upstream direction, that is, slave node 92→master node 91. The upstream delay Dsm is obtained using the following formula: arrival time t4−(departure time t3−offset value).

If it is assumed that the downstream delay Dms=the upstream delay Dsm, the slave node 92 obtains the offset value using the following Formula 1.

Offset value=((arrival time $t2$–departure time $t1$)– (arrival time $t4$–departure time $t3$))/2  (Formula 1)

Then, due to the slave node 92 correcting the time of the clock of the slave node 92 using the obtained offset value, the clock of the master node 91 and the clock of the slave node 92 are synchronized (time-matched).

Here, when there are multiple upstream master nodes 91 as viewed by a slave node 92, it is necessary to select one of the master nodes 91 as a synchronization partner. That is, when the route of the PTP packet branches upstream of the slave node 92, the slave node 92 operates an algorithm (master selection algorithm) for selecting the master node 91 on the route of the PTP packet to be used by the slave node 92. For example, NPL 1 describes an improved version of (Alternate) BMCA (Best Master Clock Algorithm), which is a master selection algorithm.

CITATION LIST

Non-Patent Literature

[NPL 1] ITU-T (International Telecommunication Union Telecommunications Standardization Sector), "Precision time protocol telecom profile for phase/time synchronization with full timing support from the network", Section ITU-TG.8275.16.3, June 2016.

SUMMARY OF THE INVENTION

Technical Problem

There has been demand for an increase in precision in a usage scene such as the mobile field of time synchronization, and there has been demand for an increase in precision of a time synchronization apparatus. For example, a precision class obtained by segmenting a maximum time error per BC (one apparatus) by a predetermined value is used as an index of precision. Examples of precision classes are indicated below.

(Precision class A)=Maximum time error is 100 [ns] or less.
(Precision class B)=Maximum time error is 70 [ns] or less.
(Precision class C)=Maximum time error is 20 [ns] or less.
(Precision class D)=Maximum time error is 10 [ns] or less.

For example, if the maximum time error=50 [ns], the conditions of precision classes A and B are both satisfied, and therefore the precision class B with the stricter (better) condition is used. Note that in ITU-T, standardization of a T-BC (Telecom-Boundary Clock) for a telecommunications carrier among BCs is performed, and A to D are defined as the precision classes.

Although the maximum absolute errors of the current classes A and B are 100 ns and 70 ns, it is envisioned that around 20 ns will be reached based on class C, and it is envisioned that the gap between B and C will be wider than the gap between A and B. The precision classes C and D will be standardized in the future in anticipation of a 5G mobile application.

Here, apparatuses of classes A and B have already been adopted for the current 4G-LTE, and it is essential to switch to apparatuses of higher-performance classes C and D for 5G. A state is envisioned in which different precision classes B and C both exist in the network in this switching period.

However, with the improved version of BMCA of NPL 1, consideration has not been given to an environment in which different precision classes are both present, and therefore the route with fewer apparatuses is simply selected. However, as shown in FIG. 14 below, there are also cases in which the route selected in the improved version of BMCA is not optimal.

FIG. 14 is a configuration diagram showing an example of an apparatus for selecting a route in a time transmission system in which apparatuses of different types of precision classes are present. In this configuration diagram, the following two routes are present as potential routes to be selected by a BC node 220z.

First route=GM node 101z→BC node 201z→BC node 202z→BC node 220z

Second route=GM node 102z→BC node 211z→BC node 212z→BC node 213z→BC node 220z

Here, the number of apparatuses of the first route=2 (BC node 201z→BC node 202z) is smaller than the number of apparatuses of the second route=3 (BC node 211z→BC node 212z→BC node 213z). Thus, the improved version of BMCA that operates in the BC node 220z uses the first route (indicated by thick-lined arrows).

However, the BC nodes shown in FIG. 14 include both the BC nodes 201z and 202z, which are of a low precision class (frames denoted by broken lines in the drawing), and the BC nodes 211z to 213z, which are of a high precision class (frames denoted by solid lines in the drawing).

In this state, selecting the second route, which has a higher number of apparatuses but a higher precision class, improves the time precision transmitted on the route. That is, the route selected through the improved version of BMCA is not optimal.

In view of this, a main problem to be solved of the present invention is to optimize a route of time synchronization in a network including apparatuses with different types of apparatus performances.

Means for Solving the Problem

In order to solve the above-described problem to be solved, a time synchronization route selection apparatus of the present invention includes the following characteristics.

The present invention is a time synchronization route selection apparatus having a function of a time synchronization apparatus used in a time transmission system in which time synchronization packets are transmitted and received by time synchronization apparatuses, and times of the time synchronization apparatuses are synchronized based on the time information of transmission and reception, in which in the time transmission system, the time synchronization apparatuses having different types of apparatus performances are included, and a plurality of routes of the time synchronization packets from a time reference apparatus to the time synchronization route selection apparatus via the time synchronization apparatuses are present, each time synchronization apparatus located upstream on each route performs notification of performance information indicating an apparatus performance of the time synchronization apparatus to a time synchronization apparatus located downstream with respect thereto, and the time synchronization route selection apparatus includes: a determination index calculation unit configured to calculate a determination index for each route by referencing the performance information notified from the time synchronization apparatuses located upstream on the route; and a route selection unit configured to, based on the calculated determination index for each route, select a route for transmitting and receiving the time synchronization packets from a plurality of routes of the time synchronization packets to the time synchronization route selection apparatus.

Accordingly, the route selection unit can reflect the performance information notified from the time synchronization apparatuses in the selection of the route of time synchronization, and therefore it is possible to optimize the route of time synchronization in the time transmission system including apparatuses of multiple pieces of performance information.

In the present invention, the determination index calculation unit uses precision classes registered in advance in the time synchronization apparatuses as the performance information notified from the time synchronization apparatuses, and calculates the determination index for each route based on a spec value defined for each precision class, and the number of time synchronization apparatuses corresponding to the spec value.

Accordingly, since simple information such as the precision class indicating a fixed spec value is used as the performance information, the determination index for each route can be calculated rapidly with a small calculation amount.

In the present invention, the determination index calculation unit calculates the determination index for each route using, as the performance information notified from each of the time synchronization apparatuses, a time difference value between a measured value of time information resulting from the time synchronization apparatus performing time synchronization with the time synchronization apparatus upstream of the time synchronization apparatus and a measured value of time information obtained when performing time synchronization with the time synchronization apparatus downstream of the time synchronization apparatus.

Accordingly, since detailed information such as the measured time difference value is used as the performance information, it is possible to realize high-precision route selection in which the current state is reflected in real time.

In the present invention, each of the time synchronization apparatuses performs notification of the performance information of the time synchronization apparatus and the performance information of each time synchronization apparatus located upstream of the time synchronization apparatus to a time synchronization apparatus located downstream, which is a direct transmission and reception partner for the time synchronization packets.

Accordingly, the performance information of each time synchronization apparatus can be transmitted at a low cost without adding an apparatus other than a time synchronization apparatus.

In the present invention, each of the time synchronization apparatuses causes the performance information to be distributed from a management apparatus, which is an apparatus separate from the time synchronization apparatus, to the time synchronization apparatuses by notifying the management apparatus of the performance information of the time synchronization apparatus.

Accordingly, by adding a management apparatus that is separate from a time synchronization apparatus for route selection, it is possible to smoothly realize time synchronization processing without applying an extra load to each time synchronization apparatus.

Effects of the Invention

According to the present invention, it is possible to optimize a time synchronization route in a network including apparatuses with different types of apparatus performances.

BRIEF DESCRIPTION OF DRAWINGS

FIG. 2 is a data table that is used by a BC node in calculation for selecting a route, according to the present embodiment.

FIG. 10 is a data table for managing time errors collected by an NMS (Network Management System) according to the present embodiment.

DESCRIPTION OF EMBODIMENTS

Hereinafter, an embodiment of the present invention will be described in detail with reference to the drawings.

Figure 1:
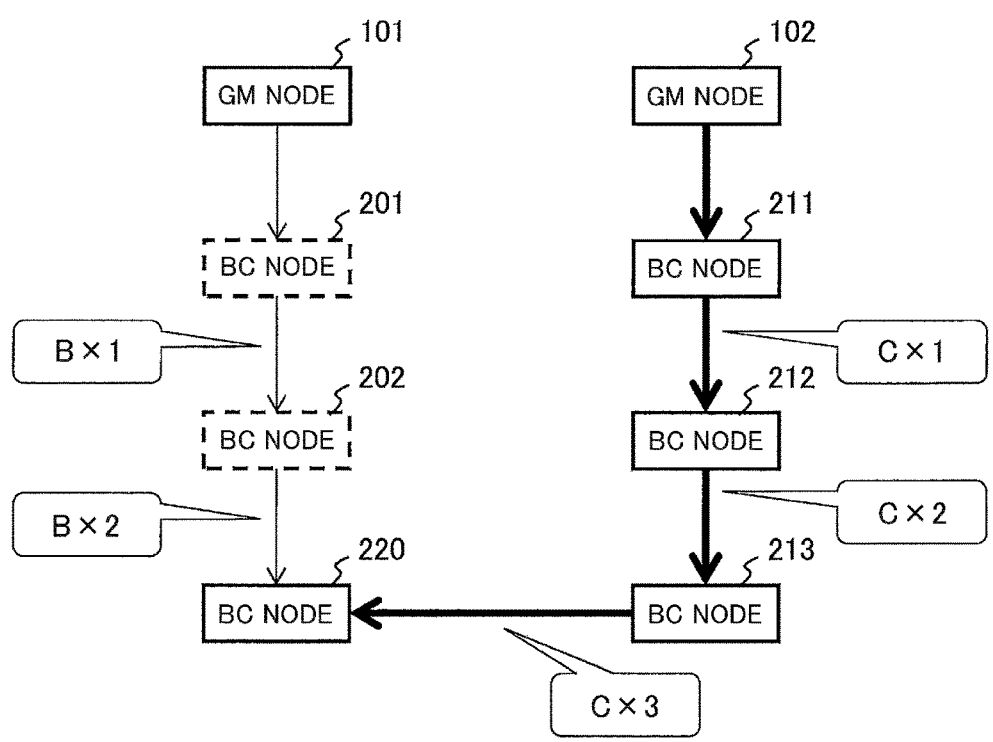
FIG. 1 is a configuration diagram showing an example of an apparatus that selects a route in a time transmission system including apparatuses with different types of precision classes according to the present embodiment.
Figure 14:
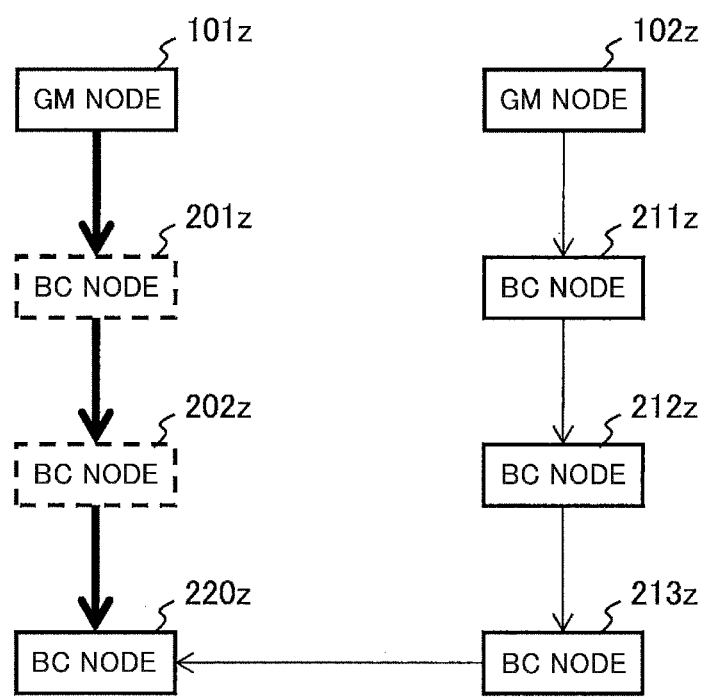
FIG. 14 is a configuration diagram showing an example of an apparatus that selects a route in a time transmission system including apparatuses of different types of precision classes.

FIG. 1 is a configuration diagram showing an example of an apparatus that selects a route in a time transmission system including apparatuses with different types of precision classes. Similarly to FIG. 14, in FIG. 1 as well, in this configuration diagram, the following two routes are present as potential routes to be selected by the BC node 220.

First route=GM node 101→BC node 201→BC node 202→BC node 220

Second route=GM node 102→BC node 211→BC node 212→BC node 213→BC node 220

Here, the number of apparatuses in the first route, which is 2 (BC node 201→BC node 202), is smaller than the number of apparatuses in the second route, which is 3 (BC node 211→BC node 212→BC node 213).

Note that the GM nodes 101 and 102 are time reference apparatuses.

Also, the BC nodes 201, 202, 211, 212, and 213 are time synchronization apparatuses.

Furthermore, the BC node 220 is a time synchronization apparatus, and is also a time synchronization route selection apparatus.

The BC node 220 selects a route taking into consideration not only the number of apparatuses, but also the precision classes. For this reason, the BC nodes on the routes perform notification of the number of passed apparatuses for each precision class (hereinafter referred to as "precision class notification") as indicated in balloons in the drawings, downstream on the route. For example, in the first route, the precision class notification is transmitted as follows. Note that, for example, the precision class notification may also be included in a surplus field of a PTP packet, and may also be stored in a packet other than a PTP packet.

The BC node 201 that receives the time synchronization from the GM node 101 creates a new precision class notification including the precision class of the BC node 201, which is B (×1), and transmits the created precision class notification to the downstream BC node 202.

The BC node 202 includes the precision class of the BC node 202, which is B, to the precision class notification received from the upstream BC node 201 (i.e., there are a total of two apparatuses with B), and transmits the resulting precision class notification to the downstream BC node 220.

The BC node 220 references the precision class notification received from the upstream BC node 202, and can thereby ascertain that there is a total of two apparatuses with the precision class B on the first route. Similarly, the BC node 220 can ascertain that there is a total of three apparatuses with the precision class C on the second route by referring to the precision class notification received from the BC node 213.

FIG. 2 is a data table used by the BC node 220 in calculation for selecting a route. The content of the precision class notification acquired via the first route (number of passed apparatuses=a total of two apparatuses with B) is stored in the first row of the data table. The content of the precision class notification acquired via the second route (number of passed apparatuses=a total of three apparatuses with C) is stored in the second row of the data table.

The maximum absolute time error [ns] of the data table is the spec value of the time synchronization apparatuses defined for each precision class. That is, the number of passed apparatuses, which is a variable, and the maximum absolute time error, which is a fixed value, are associated with each other in the data table.

As indicated by the following formula, the BC node 220 calculates the weighted sum of the number of passed apparatuses using the maximum absolute time error as the weight, as the determination index for each route.

(Determination index for route)=(maximum absolute time error of precision class $A$)×(number of passed apparatuses of precision class $A$)+(maximum absolute time error of precision class $B$)×(number of passed apparatuses of precision class $B$)+(maximum absolute time error of precision class $C$)×(number of passed apparatuses of precision class $C$)+(maximum absolute time error of precision class $D$)×(number of passed apparatuses of precision class $D$)

For example, in the first route, the calculation formula is "100×0+70×2+20×0+10×0=140". In the second route, the calculation formula is "100×0+70×0+20×30+0×0=60". Accordingly, the BC node 220 uses the second route with the smallest (best) determination index (indicated by thick-lined arrows).

Figure 3:
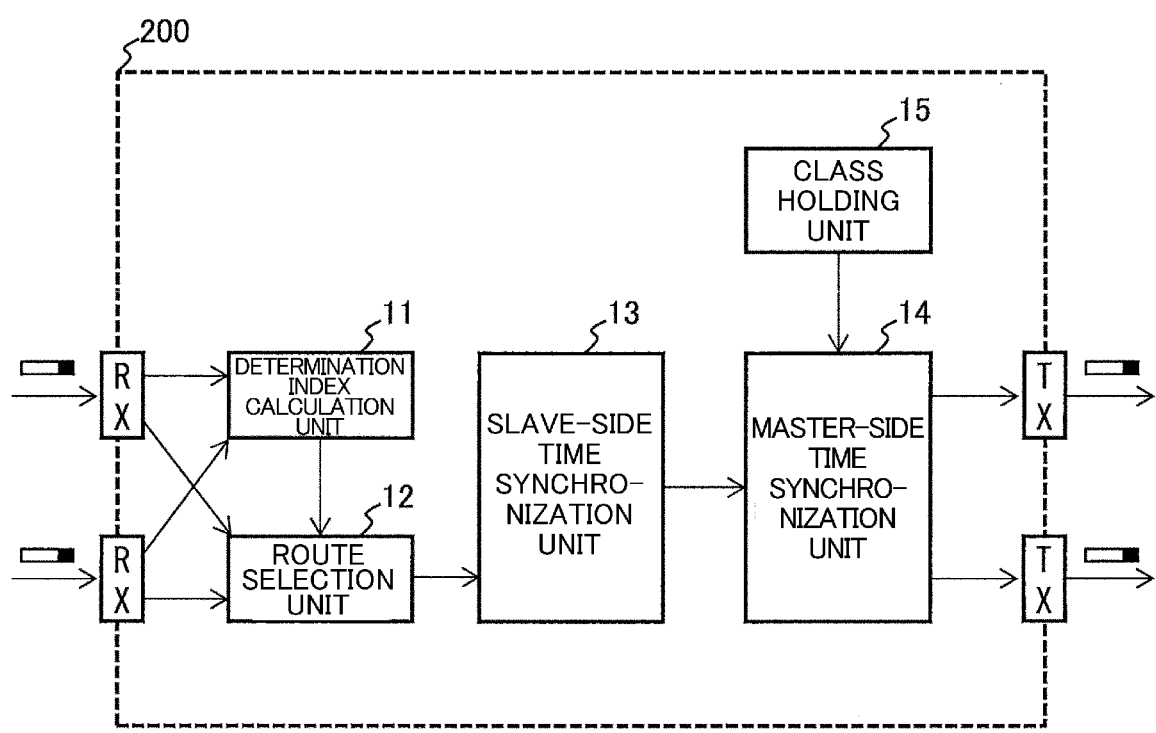
FIG. 3 is a configuration diagram of a BC node according to the present embodiment.

FIG. 3 is a configuration diagram of a BC node 200. The BC node 200 is an apparatus described as the BC nodes 201, 202, 211, 212, 213, and 220 in FIG. 2.

The BC node 200 is constituted as a computer including a CPU (Central Processing Unit), a memory, a storage means (storage unit) such as a hard disk, and a network interface.

This computer causes a control unit (control means) constituted by processing units to operate due to the CPU executing a program (also referred to as "application" or the abbreviation "app") loaded in the memory.

The BC node 200 includes a determination index calculation unit 11, a route selection unit 12, a slave-side time synchronization unit 13, a master-side time synchronization unit 14, a class holding unit 15, a receiver (RX) of PTP packets from upstream, and a transmitter (TX) of PTP packets downstream. Hereinafter, details of the constituent elements will be made clear with reference to FIG. 4.

Figure 4:
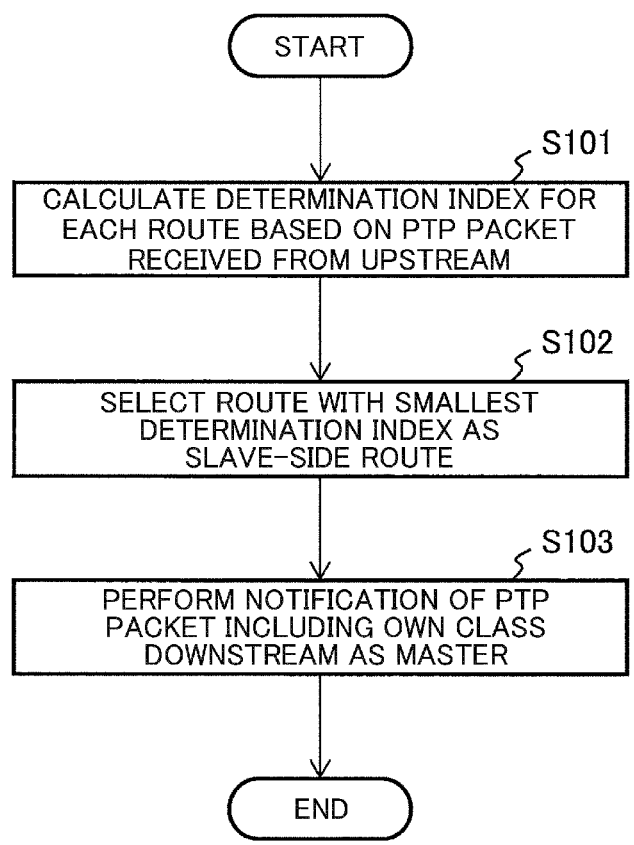
FIG. 4 is a flowchart showing content of processing performed by a BC node according to the present embodiment.

FIG. 4 is a flowchart showing content of processing performed by the BC node 200 of FIG. 3.

As illustrated in FIG. 2, the determination index calculation unit 11 receives a precision class notification, which is a PTP packet, from upstream, and calculates a determination index for each route (S101).

The route selection unit 12 selects the route with the smallest determination index as a slave-side route of the PTP packet for synchronizing the time of the BC node 200 (S102).

The slave-side time synchronization unit 13 performs time synchronization with the upstream master node according to the route selected by the route selection unit 12.

The master-side time synchronization unit 14 performs time synchronization with a downstream slave node based on the result of the time synchronization performed by the slave-side time synchronization unit 13.

The precision class of the BC node 200 is stored in the class holding unit 15 in advance by a manager or the like. The master-side time synchronization unit 14 includes the precision class read from the class holding unit 15 as a precision class notification in the PTP packet to be transmitted to the downstream slave node (S103).

Hereinafter, a case in which the processing of the route selection unit 12 is applied to the improved version of BMCA will be described in detail according to the flowcharts shown in FIGS. 5 to 8. The processing starts from FIG. 5, and the processing of FIGS. 6 to 8 is a series of processing that is connected by terminals from the processing shown in FIG. 5.

Figure 5:
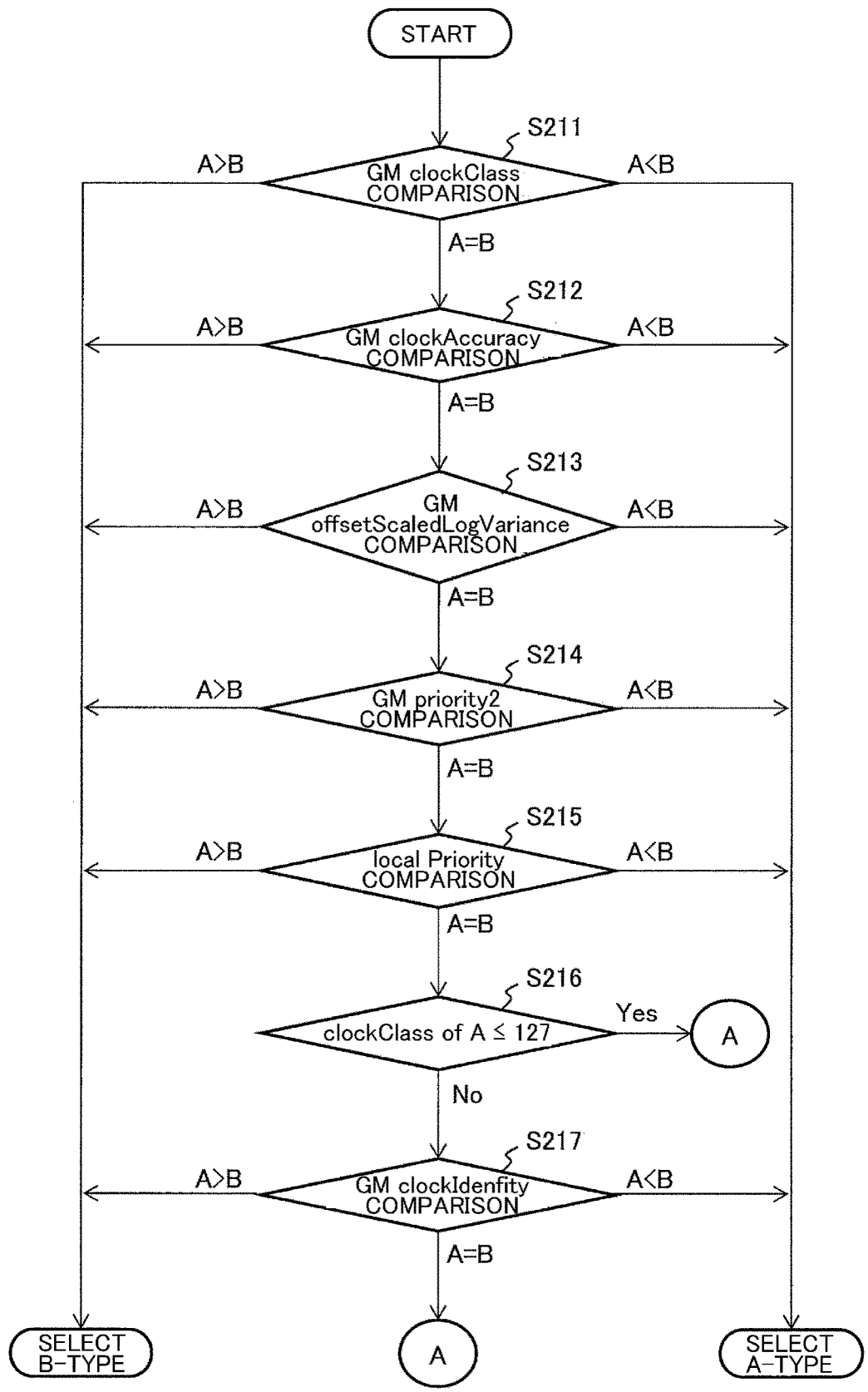
FIG. 5 is a flowchart showing processing performed by a route selection unit according to the present embodiment.
Figure 6:
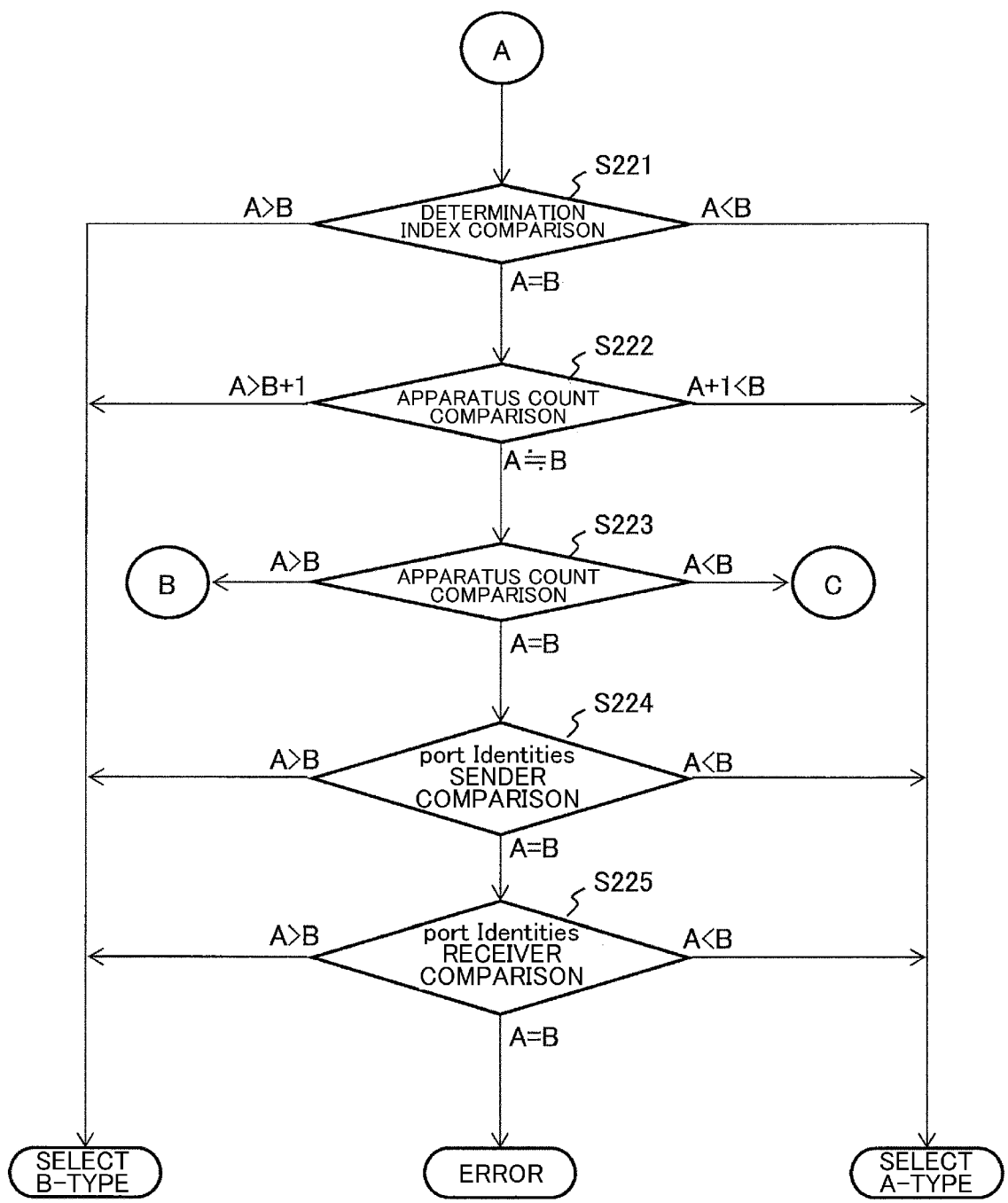
FIG. 6 is a flowchart showing processing performed after transitioning from a terminal A shown in FIG. 5 according to the present embodiment.
Figure 7:
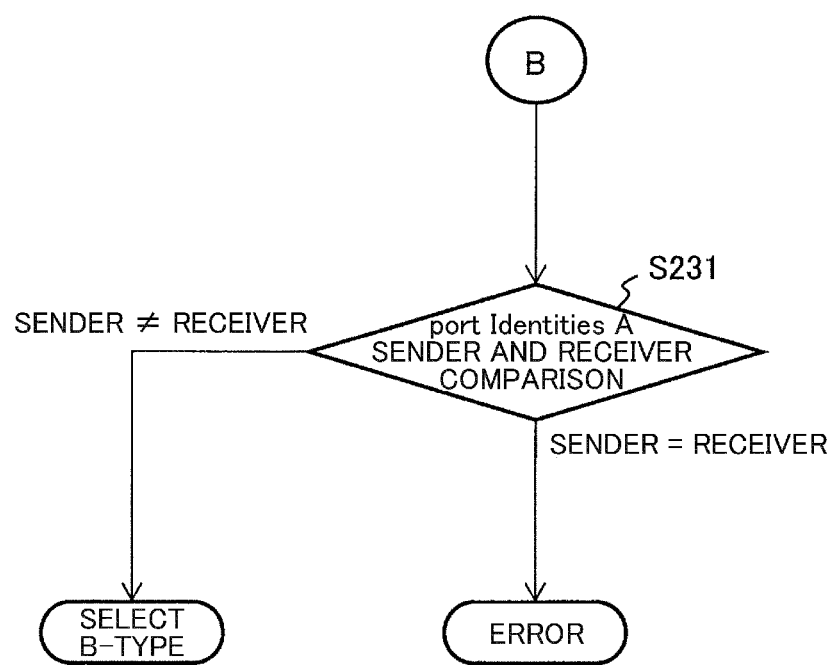
FIG. 7 is a flowchart showing processing performed after transitioning from a terminal B shown in FIG. 6 according to the present embodiment.
Figure 8:
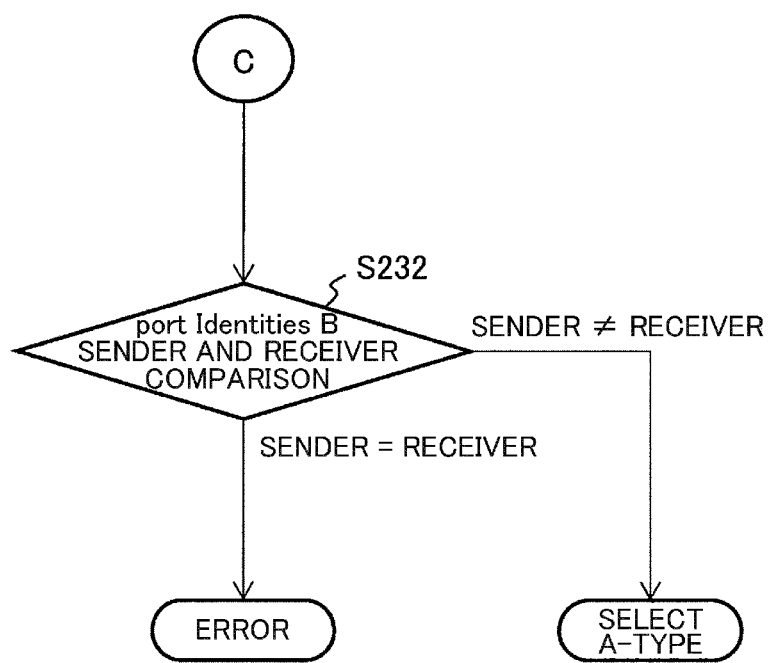
FIG. 8 is a flowchart showing processing performed after transitioning from a terminal C shown in FIG. 6 according to the present embodiment.

Here, the difference between the processing of the conventional improved version of BMCA and the processing of the present embodiment shown in FIGS. 5 to 8 is the processing of S221 shown in FIG. 6. The other processing is the same as the processing of the conventional improved version of BMCA. Accordingly, the specific parameter names, such as "GM clockClass" of S211 and the like are the same as those of the improved version of BMCA according to NPL 1, and therefore description thereof is omitted.

FIG. 5 is a flowchart showing processing performed by the route selection unit 12. Hereinafter, a case will be considered in which a route that is one of A-type and B-type potential routes is selected.

The route selection unit 12 selects the route with the smaller parameter value through the following sequence: comparison of parameter "GM clockClass" (S211), comparison of parameter "GM clockAccuracy" (S212), comparison of parameter "GM offsetScaledLogVariance" (S213), comparison of parameter "GM priority2" (S214), and comparison of parameter "local Priority" (S215).

For example, if the "GM clockAccuracy" of A is smaller than the "GM clockAccuracy" of B, the A-type route is selected based on the branch "A<B" in S212. Here, if a parameter value is the same in the A-type and the B-type, the route selection unit 12 transitions to comparison of the next parameter.

When the parameter "clockClass of A" is 127 or less (S216, Yes), the route selection unit 12 transitions from the terminal A to FIG. 6.

The route selection unit 12 performs comparison of the parameter "GM clockIdenfity" (S217) and selects the route with the smaller parameter value. Here, the route selection unit 12 transitions from the terminal A to FIG. 6 also when A=B.

The parameters illustrated in FIG. 5 above are categorized as follows.

(1) Processing for comparing parameters indicating the time synchronization state (time quality information) (S211, S212, S213)

(2) Processing for comparing parameters indicating priority level settings (S214, S215)

(3) Processing for comparing parameters indicating identification codes and the like (S216, S217)

FIG. 6 is a flowchart showing processing performed after transitioning from the terminal A of FIG. 5.

The route selection unit 12 selects the route with the smaller parameter value in the following sequence: comparison of parameter "determination index" (S221), comparison of parameter "number of apparatuses (stepsRemoved)" (S222, S223), comparison of parameter "portIdentities of sender" (S224), and comparison of parameter "portIdentities of receiver" (S225).

Here, in S221, the comparison processing performed based on the determination index shown in FIG. 2 is added based on the improved version of BMCA.

Also, in the processing for comparing the parameter "number of apparatuses (stepsRemoved)", when there is a difference of 2 or more in the number of apparatuses between the routes A and B, the route with the smaller parameter value is immediately selected (S222). On the other hand, when there is a slight difference of 1 or less (A≈B) in the number of apparatuses between the routes A and B, the terminal B is transitioned to in the case where the route B is smaller, and the terminal C is transitioned to in the case where the route A is smaller (S223).

FIG. 7 is a flowchart showing processing performed after transitioning from the terminal B of FIG. 6.

In the foregoing description, processing for comparing the same parameters between the routes A and B was performed, but in S231 shown in FIG. 7, the route selection unit 12 compares the parameter "portIdentities" between the sender and the receiver belonging to the same route A. When the comparison results of S231 match, the route selection unit 12 sends back an error, and if they do not match, the route selection unit 12 selects the B-type route.

FIG. 8 is a flowchart showing processing performed after transitioning from the terminal C of FIG. 6.

Similarly to S231 of FIG. 7, the route selection unit 12 compares the parameter "portIdentities" between the sender and the receiver belonging to the same route B (S232). When the comparison results of S232 match, the route selection unit 12 sends back an error, and if they do not match, the route selection unit 12 selects the A-type route.

A method of selecting the optimal route using a scheme in which a precision class registered in the class holding unit 15 in advance is notified downstream using a precision class notification was described above with reference to FIGS. 1 to 8.

Hereinafter, a method in which each BC node 200 selects the optimal route using a time error measured by the BC node 200 instead of a pre-registered precision class will be described in FIG. 9 and onward. The measured time error is the error from the time information of the slave-side time synchronization unit 13 to the time information transmitted to the master-side time synchronization unit 14. This time error indicates an actual power value obtained by directly measuring the performance at the synchronization precision of the BC node 200.

Figure 9:
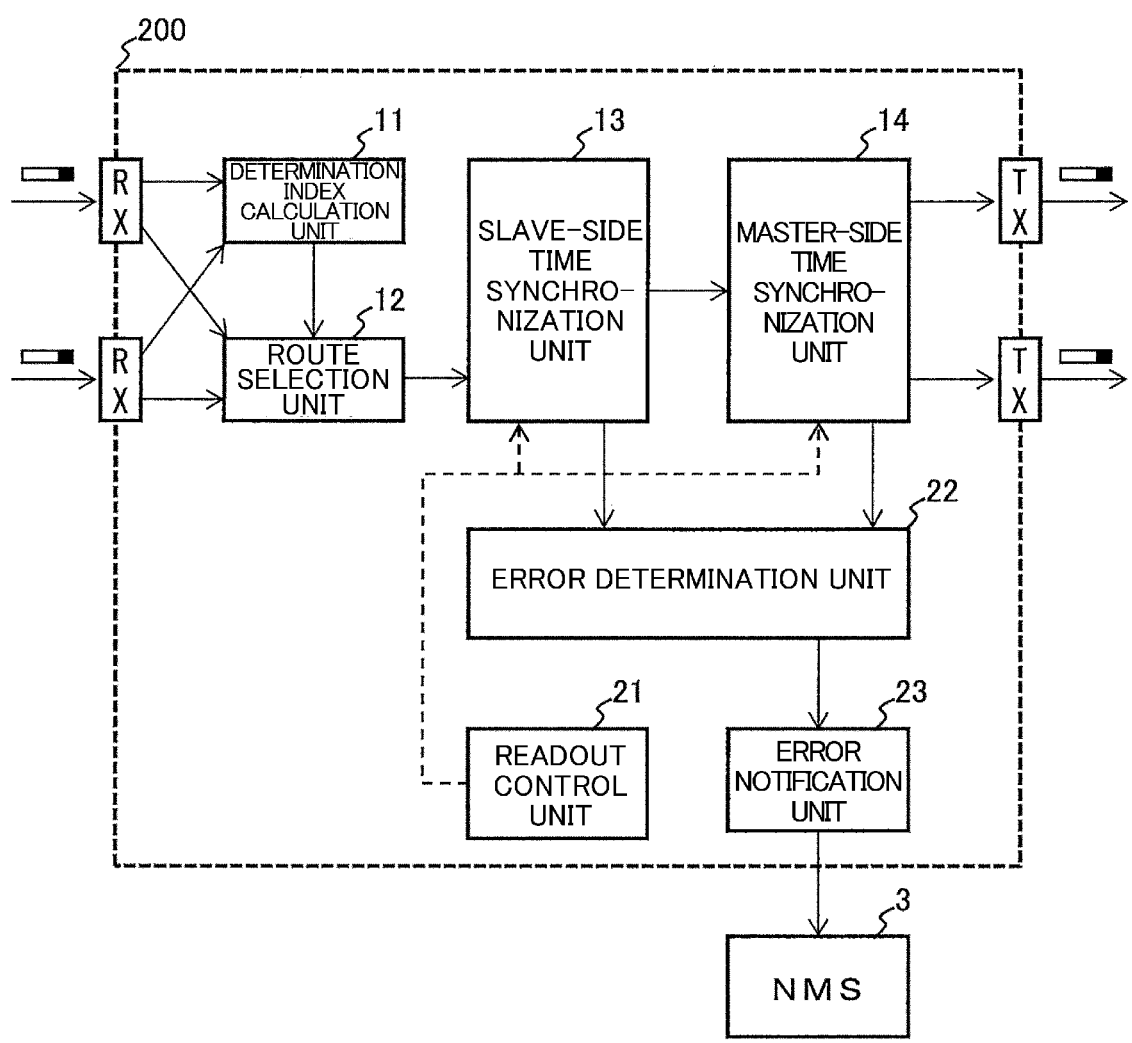
FIG. 9 is a configuration diagram of a BC node of a mode different from that of FIG. 3 according to the present embodiment.

FIG. 9 is a configuration diagram of a BC node 200 of a mode different from that of FIG. 3. In comparison with the BC node 200 shown in FIG. 3, the BC node 200 shown in FIG. 9 has a configuration obtained by newly adding a readout control unit 21, an error determination unit 22, and an error notification unit 23 while removing the class holding unit 15.

The readout control unit 21 performs notification of a signal for reading out the result of the time synchronization processing (readout signal) to the slave-side time synchronization unit 13 and the master-side time synchronization unit 14 at the same timing (illustrated by broken-line arrows).

The error determination unit 22 compares the time synchronization results of the slave-side time synchronization unit 13 and the master-side time synchronization unit 14 read out according to the readout signals, and measures (determines) the time difference value (time error) of both.

The error notification unit 23 notifies the NMS 3 of the time error obtained by the error determination unit 22. The NMS 3 is an apparatus that manages the BC nodes 200 and distributes (relays) the time errors collected from the upstream BC nodes 200 to the downstream BC nodes 200.

FIG. 10 is a data table for managing the time errors collected by the NMS 3. This data table stores actual measured values of the time errors collected from the BC nodes 200 in the order in which the PTP packets pass through the apparatuses, for each route.

The NMS 3 calculates the sum of the actual measured values of the time errors as the determination index for each route. Then, the NMS 3 notifies the downstream BC node 200 (here, the fourth apparatus in the apparatus passing sequence) of the route with the smaller calculated determination index as the optimal route.

Alternatively, instead of performing calculation of the optimal route, the NMS 3 may also cause the notified BC node 200 to calculate the optimal route by notifying a downstream BC node 200 of the parameter to be used in the calculation (actual measured value of the time error in the apparatus passing sequence).

Figure 11:
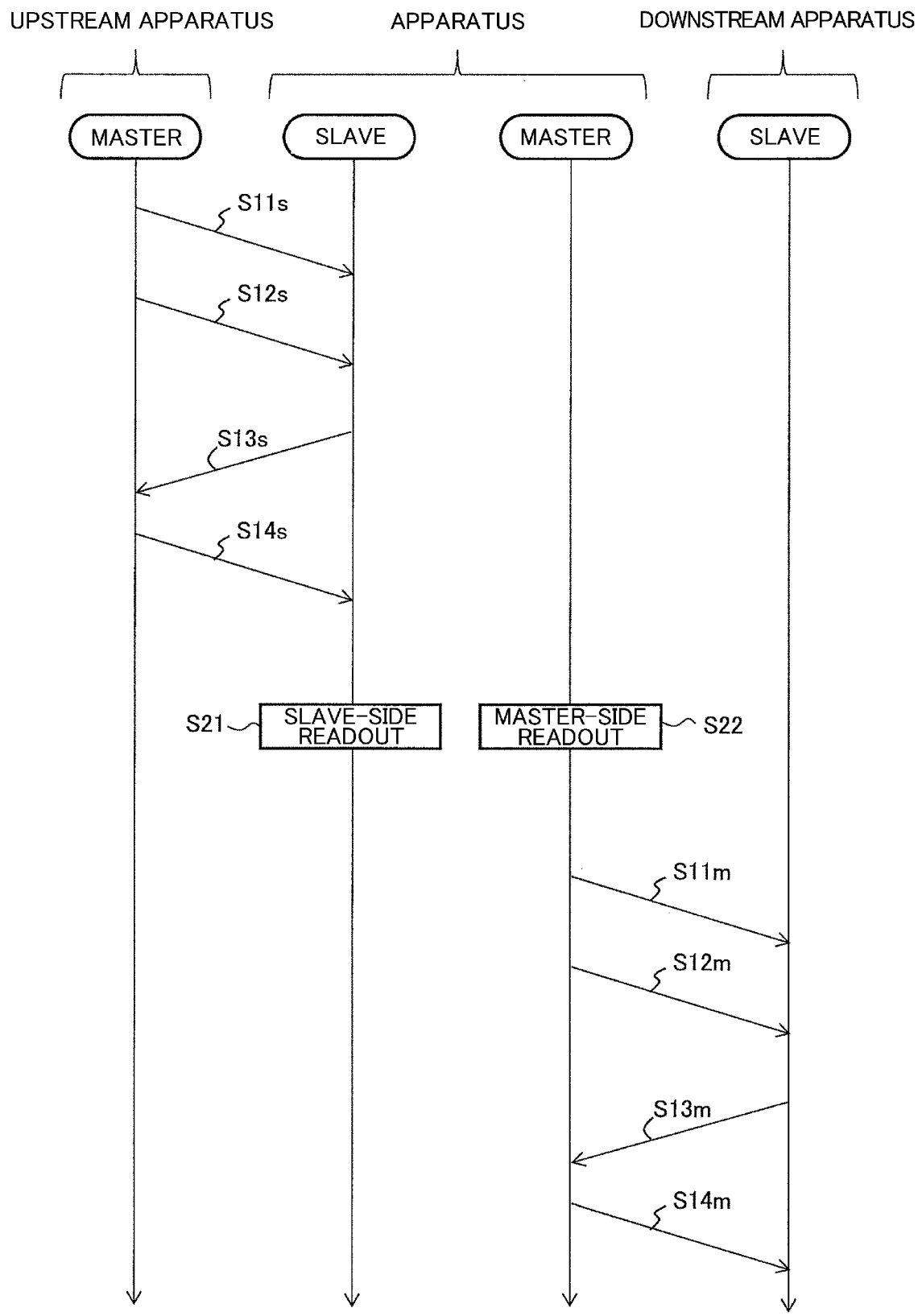
FIG. 11 is a sequence diagram for illustrating timings at which a readout control unit transmits a readout signal, according to the present embodiment.
Figure 12:
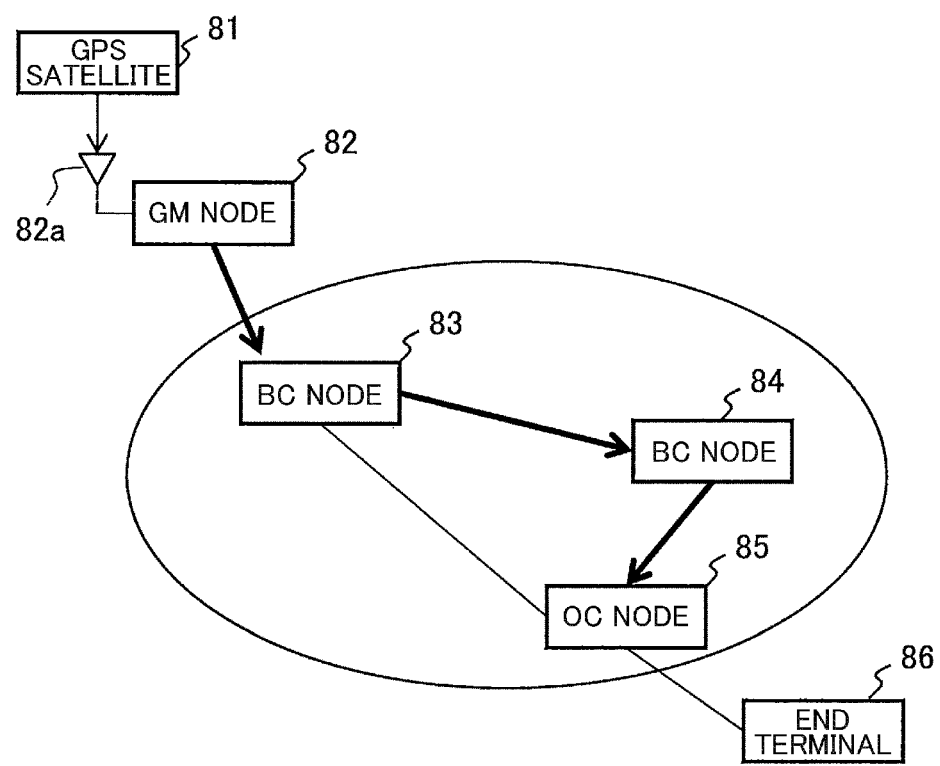
FIG. 12 is a configuration diagram of a time transmission system to which a time synchronization technique has been applied.

FIG. 11 is a sequence diagram for illustrating timings at which the readout control unit 21 transmits the readout signal. In this sequence diagram, in order starting from the left side, the master side of an upstream apparatus, the slave side of the BC node 200, the master side of the BC node 200, and the slave side of a downstream apparatus are the main operators that transmit and receive PTP packets. As described above, the master-side time synchronization unit 14 executes the master-side time synchronization processing, and the slave-side time synchronization unit 13 executes the slave-side time synchronization processing.

Figure 13:
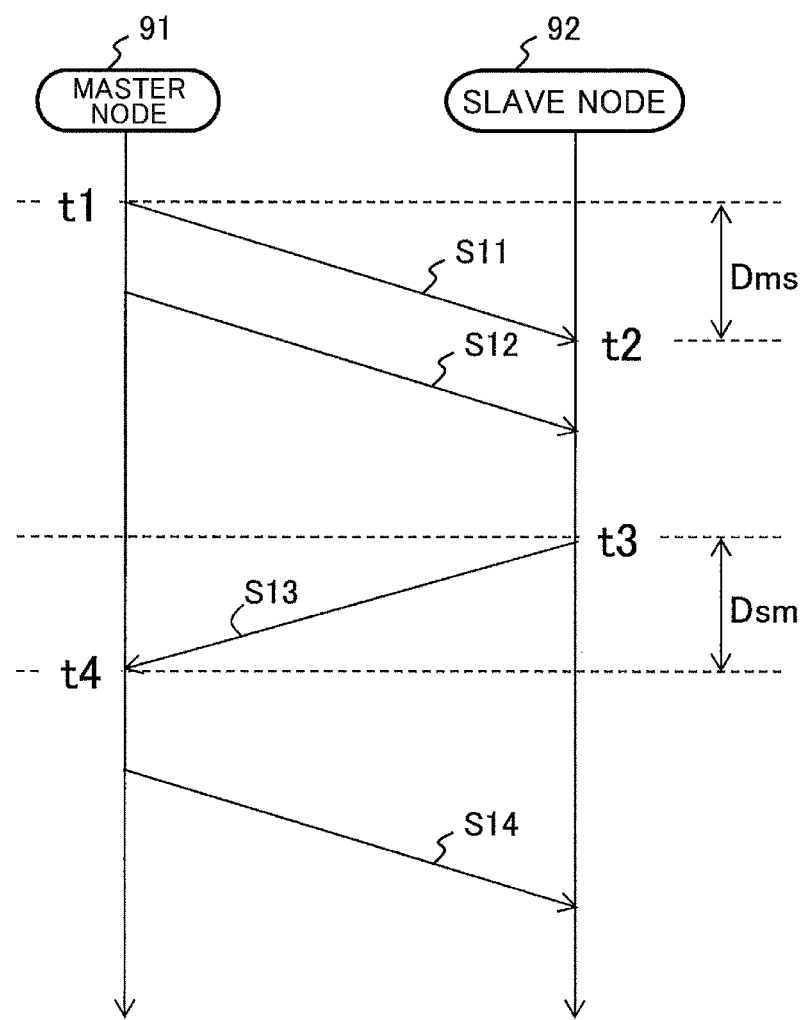
FIG. 13 is a sequence chart showing a mechanism of PTP.

As described in FIG. 13, a Sync message (S11s), a Follow-up message (S12s), a Delay_Request message (S13s), and a Delay_Response message (S14s) are transmitted and received in the stated order as PTP packets by the master-side time synchronization unit 14 of the upstream apparatus and the slave-side time synchronization unit 13 of the BC node 200. The Sync message is transmitted in a period from a departure time t1s to an arrival time t2s, and the Delay_Request message is transmitted in a period from a departure time t3s to an arrival time t4s. Accordingly, the slave-side time synchronization unit 13 of the BC node 200 executes the time synchronization processing.

Thereafter, a Sync message (S11m), a Follow-up message (S12m), a Delay_Request message (S13m), and a Delay_Response message (S14m) are transmitted and received in the stated order as PTP packets by the master-side time synchronization unit 14 of the BC node 200 and the slave-side time synchronization unit 13 of the downstream apparatus. The Sync message is transmitted in a period from a departure time t1m to an arrival time t2m, and the Delay_Request message is transmitted in a period from a departure time t3m to an arrival time t4m.

Here, the timing at which the readout control unit 21 transmits the readout signal is desirably the period from the time at which the Delay_Response message (S14s) arrives at the slave-side time synchronization unit 13 of the BC node 200 and the time synchronization processing performed by the slave-side time synchronization unit 13 is executed (terminates), to the time at which the Sync message (S11m) is transmitted due to the master-side time synchronization unit 14 of the BC node 200 starting (reproducing) the time synchronization processing.

In this period, the readout control unit 21 transmits the readout signal to the slave-side time synchronization unit 13 of the BC node 200 and reads out the slave-side time synchronization result (S21), and transmits the readout signal to the master-side time synchronization unit 14 of the BC node 200 and reads out the master-side time synchronization result (S22).

Note that the higher the frequency of transmitting the readout signal, that is, the frequency of measuring the time error, is, the higher the precision of the measured values in which the current state is reflected in real time that can be acquired is, but the apparatus load applied in the measurement processing also increases.

In the present embodiment described above, the BC node 200 ascertains the time errors of the upstream BC nodes 200, and determines the route of the BC node 200 based on the ascertained time errors. Accordingly, compared to the improved version of BMCA of NPL 1 in which the route is simply determined based on only the number of BC nodes 200 that have been passed through, a highly-precise route (with little error) that also gives consideration to the apparatus performances of the individual BC nodes 200 can be determined.

Furthermore, the BC node 200 that determined the route notifies the downstream BC node 200 of the time error of the BC node 200 as well as the time errors of the upstream BC nodes 200, whereby it is possible to supply optimal (highly-precise) time information in the overall network from the GM to the end terminal (end application).

Note that in the foregoing description, an example was described in which methods for notifying the type of apparatus performance and the apparatus performance downstream were combined as follows.

The BC node 200 shown in FIG. 3, which treats the precision class as the apparatus performance, notifies the downstream BC node 200 connected thereto using a precision class notification including a precision class.

The BC node 200 shown in FIG. 9, which treats the time error as the apparatus performance, notifies the NMS 3 of the measurement result of the time error of the BC node 200.

On the other hand, the BC node 200 may also notify the NMS 3 of the precision class, and may also notify a downstream BC node 200 of a precision class notification including the time error.

Note that in the present embodiment, in the time transmission system, a case was illustrated in which one route is selected from two routes shown in FIG. 1. On the other hand, there is no limitation to this number of routes, and the optimal route in which the determination index is optimal (the smallest value) may also be selected from three or more potential routes.

Also, the present embodiment can be realized by a program that causes hardware resources of a common computer to operate as the means of the 3C node 200. This program can also be distributed via a communication line, or be distributed stored in a storage medium such as CD-ROM.

REFERENCE SIGNS LIST

3 NMS
11 Determination index calculation unit
12 Route selection unit
13 Slave-side time synchronization unit
14 Master-side time synchronization unit
15 Class holding unit
21 Readout control unit
22 Error determination unit
23 Error notification unit
91 Master node
92 Slave node
101, 102 GM node (time reference apparatus)
201, 202, 211, 212, 213BC node (time synchronization apparatus)
220 BC node (time synchronization apparatus, time synchronization route selection apparatus)

The invention claimed is:

1. A time synchronization route selection apparatus having a function of a time synchronization apparatus used in a time transmission system in which time synchronization packets are transmitted and received by time synchronization apparatuses, and times of the time synchronization apparatuses are synchronized based on time information of transmission and reception, wherein in the time transmission system, the time synchronization apparatuses having different types of apparatus performances are included, and a plurality of routes of the time synchronization packets from a time reference apparatus to the time synchronization route selection apparatus via the time synchronization apparatuses are present, each time synchronization apparatus located upstream on each route performs notification of performance information indicating an apparatus performance of the time synchronization apparatus to a time synchronization apparatus located downstream with respect thereto, and the time synchronization route selection apparatus includes:

a determination index calculation unit, including one or more processors, configured to calculate a determination index for each route by referencing the performance information notified from the time synchronization apparatuses located upstream on the route, wherein the determination index calculation unit is configured to:
use precision classes registered in advance in the time synchronization apparatuses as the performance information notified from the time synchronization apparatuses, and
calculate the determination index for each route based on a spec value defined for each precision class, and a number of time synchronization apparatuses corresponding to the spec value; and
a route selection unit, including one or more processors, configured to, based on the calculated determination index for each route, select a route for transmitting and receiving the time synchronization packets from a plurality of routes of the time synchronization packets to the time synchronization route selection apparatus.

2. The time synchronization route selection apparatus according to claim 1, wherein each of the time synchronization apparatuses is configured to perform notification of the performance information of the time synchronization apparatus and performance information of each time synchronization apparatus located upstream of the time synchronization apparatus to a time synchronization apparatus located downstream, which is a direct transmission and reception partner for the time synchronization packets.

3. The time synchronization route selection apparatus according to claim 1, wherein each of the time synchronization apparatuses is configured to cause the performance information to be distributed from a management apparatus, which is an apparatus separate from the time synchronization apparatus, to downstream time synchronization apparatuses by notifying the management apparatus of the performance information of the time synchronization apparatus.

4. A time synchronization route selection apparatus having a function of a time synchronization apparatus used in a time transmission system in which time synchronization packets are transmitted and received by time synchronization apparatuses, and times of the time synchronization apparatuses are synchronized based on time information of transmission and reception, wherein in the time transmission system, the time synchronization apparatuses having different types of apparatus performances are included, and a plurality of routes of the time synchronization packets from a time reference apparatus to the time synchronization route selection apparatus via the time synchronization apparatuses are present, each time synchronization apparatus located upstream on each route performs notification of performance information indicating an apparatus performance of the time synchronization apparatus to a time synchronization apparatus located downstream with respect thereto, and the time synchronization route selection apparatus includes:
a determination index calculation unit, including one or more processors, configured to calculate a determination index for each route by referencing the performance information notified from the time synchronization apparatuses located upstream on the route, wherein the determination index calculation unit is configured to calculate the determination index for each route using, as the performance information notified from each of the time synchronization apparatuses, a time difference value between a measured value of time information resulting from the time synchronization apparatus performing time synchronization with the time synchronization apparatus upstream of the time synchronization apparatus and a measured value of time information obtained when performing time synchronization with the time synchronization apparatus downstream of the time synchronization apparatus; and
a route selection unit, including one or more processors, configured to, based on the calculated determination index for each route, select a route for transmitting and receiving the time synchronization packets from a plurality of routes of the time synchronization packets to the time synchronization route selection apparatus.

5. A time synchronization route selection method to be executed by a time synchronization route selection apparatus having a function of a time synchronization apparatus used in a time transmission system in which time synchronization packets are transmitted and received by time synchronization apparatuses, and times of the time synchronization apparatuses are synchronized based on time information of transmission and reception, wherein in the time transmission system, the time synchronization apparatuses having different types of apparatus performances are included, and a plurality of routes of the time synchronization packets from a time reference apparatus to the time synchronization route selection apparatus via the time synchronization apparatuses are present, each time synchronization apparatus located upstream on each route performs notification of performance information indicating an apparatus performance of the time synchronization apparatus to a time synchronization apparatus located downstream with respect thereto, the time synchronization route selection apparatus includes a determination index calculation unit including one or more processors and a route selection unit including one or more processors, the time synchronization route selection method comprising:
calculating, by the determination index calculation unit, a determination index for each route by referencing the performance information notified from each time synchronization apparatus located upstream on the route, and based on the calculated determination index for each route, wherein calculating the determination index comprises:
using, by the determination index calculation unit, precision classes registered in advance in the time synchronization apparatuses as the performance information notified from the time synchronization apparatuses, and
calculating, by the determination index calculation unit, the determination index for each route based on a spec value defined for each precision class, and a number of time synchronization apparatuses corresponding to the spec value; and
selecting, by the route selection unit, a route for transmitting and receiving the time synchronization packets from a plurality of routes of the time synchronization packets to the time synchronization route selection apparatus.

6. The time synchronization route selection method according to claim 5, wherein each of the time synchronization apparatuses is configured to perform notification of the performance information of the time synchronization apparatus and performance information of each time synchronization apparatus located upstream of the time synchronization apparatus to a time synchronization apparatus located downstream, which is a direct transmission and reception partner for the time synchronization packets.

7. The time synchronization route selection method according to claim 5, wherein each of the time synchronization apparatuses is configured to cause the performance information to be distributed from a management apparatus, which is an apparatus separate from the time synchronization apparatus, to downstream time synchronization apparatuses by notifying the management apparatus of the performance information of the time synchronization apparatus.

* * * * *